(12) United States Patent
Tucker et al.

(10) Patent No.: US 7,581,911 B2
(45) Date of Patent: Sep. 1, 2009

(54) PLASTIC IMPACT DRIVEN FASTENERS

(75) Inventors: Pamela S. Tucker, Austin, TX (US); Nancy Showers, Austin, TX (US)

(73) Assignee: Utility Composites International Limited, Round Rock, TX (US)

( * ) Notice: Subject to any disclaimer, the term of this patent is extended or adjusted under 35 U.S.C. 154(b) by 304 days.

(21) Appl. No.: 10/246,791

(22) Filed: Sep. 18, 2002

(65) Prior Publication Data

US 2004/0050478 A1    Mar. 18, 2004

(51) Int. Cl.
   *F16B 15/00* (2006.01)
(52) U.S. Cl. .................. 411/487; 411/908
(58) Field of Classification Search ........ 411/903, 411/908, 920, 487, 377
   See application file for complete search history.

(56) References Cited

U.S. PATENT DOCUMENTS

| | | | |
|---|---|---|---|
| 2,357,637 A * | 9/1944 | Drypolcher | 206/340 |
| 2,510,693 A | 6/1950 | Green | |
| 3,112,667 A | 12/1963 | Brentlinger | |
| 3,165,968 A | 1/1965 | Anstett | |
| 3,225,917 A | 12/1965 | Couch | |
| 3,252,569 A | 5/1966 | Matthews | |
| 3,296,048 A * | 1/1967 | Wolfe | 156/97 |
| 3,348,669 A | 10/1967 | Powers | |
| 3,492,907 A | 2/1970 | Hauck | |
| 3,618,447 A * | 11/1971 | Goins | 411/456 |
| 3,813,985 A | 6/1974 | Perkins | |
| 3,853,606 A * | 12/1974 | Parkinson | 428/461 |
| 3,915,299 A | 10/1975 | Miyaoku | |
| 3,936,407 A * | 2/1976 | Parkinson | 524/69 |
| 4,206,264 A | 6/1980 | Kurr | |
| 4,456,123 A | 6/1984 | Russell | |
| 4,664,733 A * | 5/1987 | Masago | 156/212 |
| 4,681,497 A * | 7/1987 | Berecz | 411/377 |
| 4,826,381 A | 5/1989 | Kiriyama | |
| 4,863,330 A | 9/1989 | Olez et al. | |
| 4,903,831 A | 2/1990 | Francis | |
| 4,909,690 A | 3/1990 | Gapp et al. | |

(Continued)

FOREIGN PATENT DOCUMENTS

CA    2183545    8/1995

(Continued)

OTHER PUBLICATIONS

"Understanding Retreading"; *International Tire & Rubber Associatoin Foundation, Inc.*; 2001; 15 pages.

(Continued)

*Primary Examiner*—Flemming Saether
(74) *Attorney, Agent, or Firm*—Meyertons, Hood, Kivlin, Kowert & Goetzel, P.C.; Eric B. Meyertons

(57) ABSTRACT

Plastic impact driven fasteners having relatively high flexural strength and relatively low heat deformation temperature are provided. Additional embodiments relate to methods of using the fasteners. For example, the fasteners may be used in a tire retreading process. In such a case, one or more fasteners may be used to secure new tread to a tire core before and/or during a curing process. The curing process may also cause deformation of the fastener, thereby eliminating the need to remove the fasteners after the curing process.

48 Claims, 6 Drawing Sheets

U.S. PATENT DOCUMENTS

| | | | |
|---|---|---|---|
| 4,971,503 A | | 11/1990 | Barnell et al. |
| 5,098,940 A | | 3/1992 | Brooks |
| 5,149,237 A | | 9/1992 | Gabriel et al. |
| 5,153,250 A | | 10/1992 | Sinclair |
| 5,441,373 A | * | 8/1995 | Kish et al. ............... 411/442 |
| 5,547,325 A | | 8/1996 | Tucker et al. |
| 5,795,121 A | | 8/1998 | Tucker et al. |
| 5,937,486 A | * | 8/1999 | Bockenheimer ............. 24/297 |
| 6,168,362 B1 | | 1/2001 | Tucker et al. |

FOREIGN PATENT DOCUMENTS

| | | |
|---|---|---|
| WO | WO 95/22697 | 8/1995 |

OTHER PUBLICATIONS

"Standard test Methods for Flexural Properties of Unreinforced and Reinforced Plastics and Electrical Insulating Materials"; *ASTM Standards*, ASTM D790-02; Jun. 2002; pp. 1-9.

"Standard Test Method for Deflection Temperature of Plastics Under Flexural Load in the Edgewise Position"; *ASTM Standards*, ASTM D648-01; Oct. 2001; pp. 1-12.

Information about GE Plastics; GE Plastics web site, www.geplastics.com/resins/devprod/polymer.html; Aug. 2002; 3 pages.

Information about acrylonitrile-butadiene-styrene (ABS); efunda web site, www.efunda.com; Aug. 2002; 2 pages.

"Bayblend® FR-2000-Data Sheet"; Amco Plastic Material Inc. website, www.amco.ws; Aug. 2002; 2 pages.

"Mechanical Properties Flexural Properties"; Dow web site, www.dow.com; Aug. 2002; 1 page.

"Flexural Strength Testing of Plastics"; MatWeb site, www.matweb.com; Aug. 2002; 1 page.

"PolyOne Geon® M3000 Vinyl Compound-Rigid (RPVC)"; Online Material Data Sheet; MatWeb site, www.matweb.com; Aug. 2002; 2 pages.

"Solvay Advanced Polymers AMODEL® A-1145 HS Polyphthalamide (PPA) Resin, 45% Glass Reinforced, at 50% RH"; Online Material Data Sheet; MatWeb site, www.matweb.com; Aug. 2002; 2 pages.

"Plastx World CEVIAN® SERG1 10% GF ABS"; Online Material Data Sheet; MatWeb site, www.matweb.com; Aug. 2002; 2 pages.

"BP Amoco Barex® 210 E Acrylonitrile-Methyl Acrylate Copolymer"; Online Material Data Sheet; MatWeb site, www.matweb.com; Aug. 2002; 2 pages.

"GE Plastics Ultem® 1000 PEI, Polyetherimide, unfilled, extruded"; Online Material Data Sheet; MatWeb site, www.matweb.com; Aug. 2002; 2 pages.

"AMODEL® Polythalamide" AMOCO brochure, p. 14, date unknown.

Letter, 3 pages, Jun. 1, 1987, and brochure "Kowa T Nail" from Marukyo U.S.A., Inc., six pages, printed in Japan, date unknown.

"Resins and Compounds" 10 pages, *Modern Plastics*, Mid-Oct. 1991.

"Properties of Generic Materials", *International Plastics Selector*, A30-A33, A56-A-59, 1989.

Information about TREX, TREX web site, www.trew.com/trexdecks/working2.htm, 9 pages, Apr. 21, 1998.

"KOTOKO Integrated Plastic Fastener Maker" Hattori Group, brochure, 15 pages, date unknown.

* cited by examiner

Apply heat and pressure

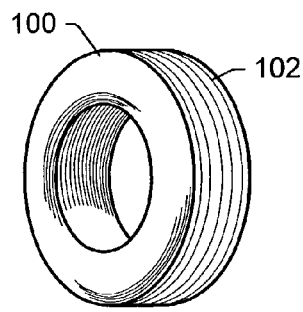
Fig. 2a
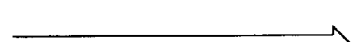
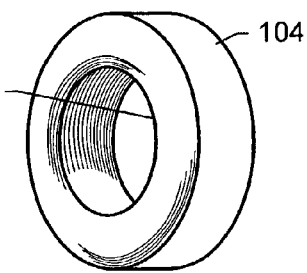
Fig. 2b
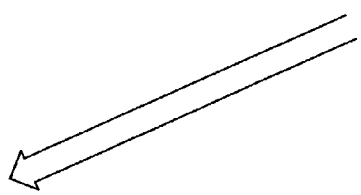
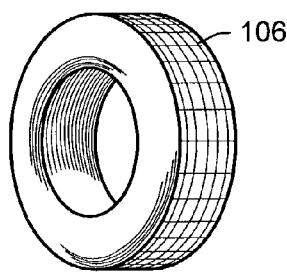
Fig. 2c
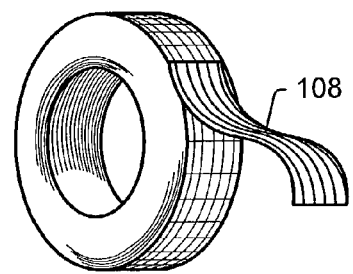
Fig. 2d
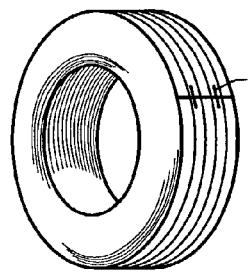
Fig. 2e
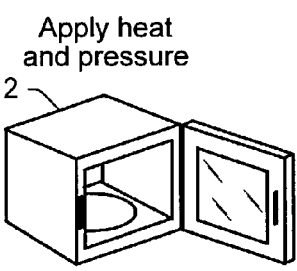
Fig. 2f
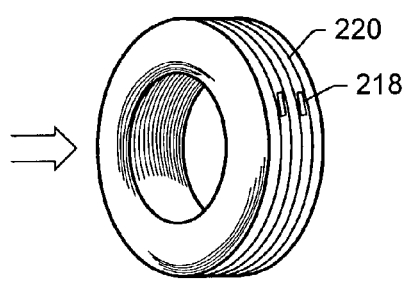
Fig. 2g

FIG. 4

Table 1

| Sample | Tradename | Polymer | Temperature (°F) A | B | C | Flexural Strength (kPsi) | Heat Deflection Temp. (°F) | Test 1 Results | Test2 Results |
|---|---|---|---|---|---|---|---|---|---|
| 1 | Geon® M3000 | rigid PVC | 180 | 420 | 90 | 13.3 | 162 | 89 | 93 |
| 2 | Unichem® 01-713 | PVC | 180 | 420 | 90 | NA | 160 | 0 | not tested |
| 3 | Unichem® 01-713A | PVC | 180 | 420 | 90 | 9.5 | 185 | 65 | 98 |
| 4 | Unichem® 01-713B | PVC | 180 | 420 | 90 | NA | 190 | 100 | 98 |
| 5 | Amodel® A1145HSNT | PPA w/ glass fiber | 250 | 610 | 210 | 43 | 549 | 100 | 100 |
| 6 | Cycolac® V100 | ABS | 180 | 420 | 90 | 10.5 | 162 | 100 | 79 |
| 7 | Bayblend® FR2000 | PC/ABS blend | 180 | 440 | 90 | 13.8 | 180 | 100 | 81 |
| 8 | Cevian® Serg1 | ABS w/glass fiber | 180 | 420 | 90 | 12.8 | 201 | 100 | 91 |
| 9 | Lustran® ABS 248-4000 | ABS | 180 | 420 | 90 | 10.7 | 187 | 100 | 83 |
| 10 | Cycolac® XFR15 | ABS reinforced | 180 | 420 | 90 | 10.2 | 160 | 78 | 80 |
| 11 | Cycolac® V100 + Capa® 6800 | ABS+PE | 180 | 400 | 90 | 10.5 | 155 | 100 | 67 |
| 12 | Cycolac® MG94 | ABS | 180 | 420 | 90 | 11.5 | 180 | 100 | 88 |
| 13 | Ultem® 1000 | Polyetherimide | 250 | 670 | 200 | 22 | 392 | 100 | 100 |
| 14 | Barex® 210 | Acrylonitrile-Methyl Acrylate Copolymer | 170 | 380 | 140 | 14 | 151 | 100 | 72 |

US 7,581,911 B2

PLASTIC IMPACT DRIVEN FASTENERS

BACKGROUND OF THE INVENTION

1. Field of the Invention

Embodiments disclosed herein generally relate to impact driven fasteners. More specifically, embodiments relate to polymeric impact driven fasteners.

2. Description of the Relevant Art

In certain tire retread processes, impact driven fasteners may be used to hold new tire tread in place during an assembly and curing process. These fasteners have traditionally been metal staples. After the assembly and curing process has been completed, the impact driven fasteners are removed. Removing the impact driven fasteners is intended to provide a good aesthetic appearance of the tire, and to satisfy the customer perception that the fasteners installed for processing purposes do not damage the tire during use (e.g., while on an vehicle).

Plastic impact driven fasteners are known for use in certain processes. For example, fasteners for use in wood assembly processes (e.g., furniture construction, woodworking, boat building, etc.) are known. Some plastic impact driven fasteners have been formed as substantially direct replacements for existing impact driven fasteners (e.g., nails, staples, etc.). In either case, plastic impact driven fasteners have typically focused on providing adequate penetration into the fastened material(s) and the durability of the fasteners.

SUMMARY OF THE INVENTION

Embodiments disclosed herein include a plastic impact driven fastener or fastener pack having relatively high flexural strength and relatively low heat deformation temperature. For example, a fastener may have a flexural strength greater than about 9500 psi. In some embodiments, a fastener may have a flexural strength greater than about 10,000 psi. In still other embodiments, a fastener may have flexural strength greater than about 12,000 psi. Such fasteners may be formed and configured to penetrate a surface having a durometer hardness greater than about 35A. In some embodiments, such fasteners may be formed and configured to penetrate a surface having a durometer hardness greater than about 60A. In still other cases, such fasteners may be formed and configured to penetrate a surface having a durometer hardness greater than about 80A.

Additionally, fasteners disclosed herein may have a heat deformation temperature sufficiently low that heat and pressure applied during a curing step of a tire retread process, may deform portions of the fasteners. For example, such fasteners may have a heat deformation temperature of less than about 250° F. In another example, such fasteners may have a heat deformation temperature of less than about 200° F. In still other examples, such fasteners may have a heat deformation temperature of less than about 180° F., or less than about 160° F.

Plastic impact driven fasteners may be used in a process to assemble two or more members together. For example, the members may be coupled using one or more impact driven fasteners. Heat may be applied to at least a portion of one member, and to at least one fastener. Additionally, pressure may be applied to at least a portion of at least one member and to at least one fastener. The applied heat and pressure may be sufficient to deform at least a portion of at least one fastener.

An example of such a process may include a tire retread process. In a tire retread process, a coupling layer may be applied to a tire core. A pre-cured tire tread may be applied over the coupling layer. Ends of the pre-cured tire tread may be secured using at least one plastic impact driven fastener. The assembled tire may be subjected to a curing process to cure the coupling layer. The curing process may deform at least a portion of at least one fastener.

One or more fasteners used in such a process may not require removal from the tire after processing. Thus, a tire processed by such a method may include portions of one or more plastic impact driven fasteners.

BRIEF DESCRIPTION OF THE DRAWINGS

Other objects and advantages of the invention will become apparent upon reading the following detailed description and upon reference to the accompanying drawings in which:

FIG. 2 depicts a schematic flow diagram of a tire retread process according to one embodiment;

FIG. 4 depicts results of several experiments in tabular form;

Figure 1A:
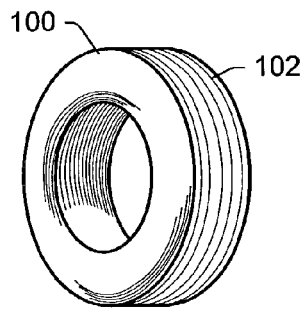
FIG. 1 depicts a schematic flow diagram of a typical tire retread process.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Embodiments disclosed herein relate to impact driven fasteners. More specifically, embodiments relate to plastic impact driven fasteners having relatively high flexural strength and relatively low heat deformation temperature. Such fasteners may be useful in applications where a traditional fastener is installed temporarily, then removed after a heating step. For example, in certain tire retreading processes, as described in more detail below, a fastener may be used to hold a tire tread in place during a heat and pressure curing step. Traditional fasteners used in such processes are generally removed after the curing step. In an embodiment, fasteners having relatively high flexural strength and relatively low heat deformation temperature may not require removal after the curing step.

Plastic fasteners and methods of manufacturing plastic fasteners are described in U.S. Pat. No. 6,168,362 to Tucker et al., U.S. Pat. No. 5,547,325 to Tucker et al. and U.S. Pat. No. 5,795,121 to Tucker et al., each of which is incorporated by reference as though fully set forth herein.

Figure 1B:
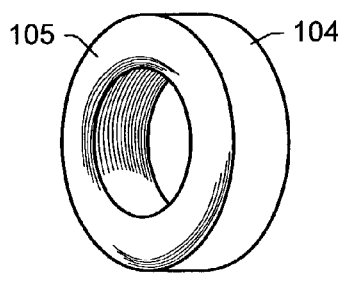

Referring to FIGS. 1a through 1i, a flow diagram of a tire retreading process is shown. FIGS. 1a though 1i represent stages in the retread process. In a receiving stage, shown in FIG. 1a, a tire 100 is received by a retreading facility. Typically, tire 100 may have relatively worn tread 102 due to use. Worn tread 102 may be removed from tire 100 during a buffing stage, as shown in FIG. 1b. For example, the buffing stage may be accomplished by use of a buffing lathe, which spins the tire while a rasp removes worn tread 102. After removal of worn tread 102, the remaining bare tire may generally be referred to as a "tire core" 105.

Figure 1C:
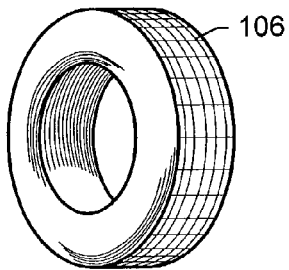

As depicted in FIG. 1c, a coupling layer 106 may be applied to tire core 105 after buffing. As used herein, a "coupling layer" may include, but is not limited to: a monomer, a polymerized composition or a partially polymerized composition. In particular retread processes, coupling layer 106 may include a polymerized or partially polymerized strip of material that may be further cured to induce cross-linking between the tire core and the tread.

Figure 1D:
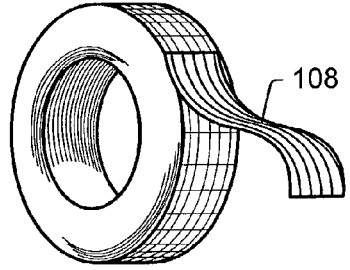
Figure 1E:
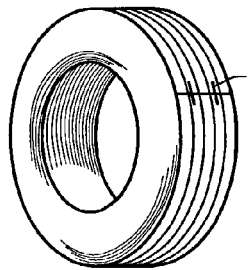

Tread 108 may be applied to tire core 105 during a tread application stage, as shown in FIG. 1d. In certain retread processes, tread 108 may be applied in a strip. In such processes, the strip of tread may be secured to tire core 105 by fasteners 110, as shown in FIG. 1e. For example, fasteners 110 may include staples. In such a case, the ends of the strip of tread may be stapled to each other. Such retread processes typically use metal staples to couple the ends of the tread. In some instances, however, problems may arise from use of metal staples to secure a tire tread. For example, staple removal may be labor intensive. Additionally, worker injury (e.g., cuts to the hand) may occur as a result of staple removal processes. Additionally, metal staples littering the floors of retread shops may puncture vacuum envelopes used in the curing process thereby increasing the number of tires that must be re-processed. Metal staples on retread shop floors may also present a risk of worker injury. In an embodiment, plastic impact driven staples may be used to secure the ends of tire tread 108.

Figure 1F:
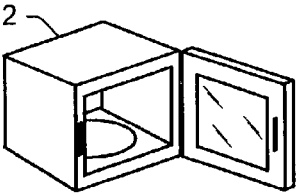

With tread 108 secured, the tire may be subjected to a curing process to cure coupling layer 106, as shown in FIG. 1f. For example, a vulcanization process may be used. Curing process 112 may typically involve applying heat and pressure to the tire. For example, in certain retread processes the tire may be wrapped in a sealing envelope. The sealing envelope may be vacuum sealed, thereby applying pressure to the tire. The tire, in the sealing envelope, may then be placed in a curing chamber. The curing chamber may apply further pressure to the tire. Additionally, the tire may be heated. The combination of heat and pressure applied to the tire may initiate curing of coupling layer 106. In a typical curing process, the process chamber temperature may have a set point in the range about 200° F. to about 290° F. In a typical curing process, the curing chamber pressure may have a set point in the range of about 10 psi to about 200 psi.

Figure 1G:
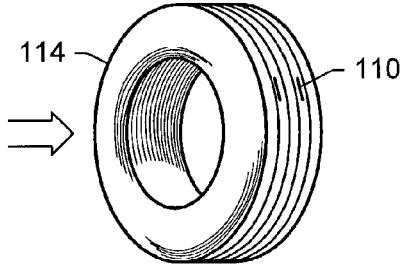
Figure 1H:
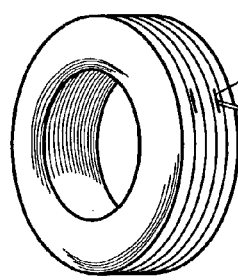
Figure 1I:
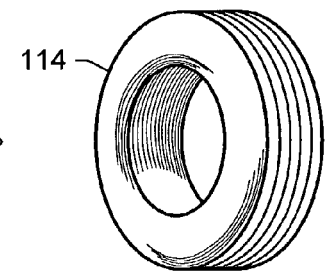

After a period of time, typically a number of hours, the tire may be removed from curing chamber 112, as shown in FIG. 1g. After curing, tire core 105 and tread 108 are securely coupled together by the cured coupling layer forming a complete tire 114. However, fasteners 110 remain in tire 114. Therefore, tire 114 may go through a fastener removal stage, as shown in FIG. 1h. At the fastener removal stage, fasteners 110 may be removed using a removal tool 116. Removal of fasteners 110 may be problematic in some cases. For example, fastener removal tool 116 may accidentally damage tire 114. Another problem that may arise is that an operator removing staples may be injured. For example, the operator may cut his or her hand with the staple removal tool or a metal staple. After removal of fasteners 110, processing of tire 114 is complete, as depicted in FIG. 1i. Other stages and/or process steps may be included in a tire retread process as well, including but not limited to: inspections processes, tire core selection, tire core repair, etc.

Referring now to FIGS. 2a through 2g, an embodiment of an improved tire retread process is depicted. In the embodiment depicted in FIGS. 2a through 2g, the stages depicted in FIGS. 2a through 2d may proceed in the same manner as the stages depicted in FIGS. 1a through 1d. That is, a tire 100 may be selected for retreading. Old tread 102 may be removed from tire 100 to form a smooth surface 104 on tire core 105. A coupling layer 106 may be applied to tire core 105, and tire tread 108 maybe placed over coupling layer 106.

However, as depicted in FIG. 2e, one or more plastic impact driven fasteners 210 may be used to secure tread 108 during the tread application stage. In an embodiment, plastic fasteners 210 may be directly interchangeable with metal fasteners 110. That is, an impact fastener driving device used to drive metal fasteners 110 may be used without modification to drive plastic fasteners 210. In other embodiments, an impact fastener driver specially adapted for plastic fasteners 210 may be used. Plastic impact driven fasteners 210 may be formed to at least partially penetrate tire tread 108. Thus, fasteners 210 may have flexural strength sufficient to inhibit buckling or crushing of fasteners 210 during driving of fasteners 210 into tread 208. Additionally, while fasteners 210 may have sufficient flexural strength to at least partially penetrate tread 208 when driven at relatively high speeds (e.g., by an impact fastener driving device), they may not have sufficient flexural strength to penetrate tire core 105 at relatively low speeds (e.g., during normal use of the tire).

After tread 208 is secured, tire core 105, tread 108 and coupling layer 106 may be prepared for a curing process 112 as previously described. Specifically, they may be sealed in a sealing envelope. The sealing envelope may be vacuum sealed, thus applying pressure to tire core 105, tread 108, coupling layer 106 and fasteners 210. Coupling layer 106 may be cured by application of heat or applications of heat and additional pressure, as depicted in FIG. 2f. In an embodiment, plastic fasteners 210 may be deformed by heat and pressure applied during curing process 112. For example, at least a portion of at least one of fasteners 210 may be melted by the applied heat. Alternately, at least a portion of at least one of fasteners 210 may be softened sufficiently by the applied heat for the applied pressure to flatten exposed portions of the fastener(s). In certain embodiments, heat and pressure applied during curing process 112 may also cause a head portion of at least one fastener 210 to separate from a penetrating portion of the fastener. Additionally, in some embodiments, heat and pressure applied during curing process 112 may be sufficient to soften a penetrating portion of at least one fastener 210. In an embodiment, no changes may be required in curing process 112 as a result of using plastic fasteners 210. In alternate embodiments, curing process 112 may be modified for use with plastic fasteners 210. For example, heat and/or pressure applied during curing process 112 may be adjusted to facilitate use of plastic fasteners 210.

After curing, tire 220 may be complete, as depicted in FIG. 2g. In an embodiment, there may be no need to remove exposed portions 218 of the deformed fasteners from tire 220. Exposed portions 218 of the deformed fastener may separate from penetrating portions of the fasteners by normal use of tire 220. Alternately, if there is a desire to remove exposed portions 218 of deformed fasteners (e.g., to improve the appearance of tire 220), the exposed portions may be removed by hand or otherwise without the need to penetrate or pry against tire 220. In an embodiment, penetrating portions of fasteners 210 may be left in tire 220 without substantial risk of damaging tire 220. In such embodiments, the penetrating portion of the fasteners may wear down as the tire tread wears down.

Additionally, fasteners 210 may be formed such that the color of the fasteners substantially matches the color of tread 108. For example, fasteners 210 may be black since most tire tread is black. In another example, only penetrating portions of fasteners 210 may be black since they may remain in completed tire 220. In such a case, head portions of fasteners 210 may be any color as selected for a desired affect. In still another example, fasteners 210 may be any color before curing process 112; however, application of heat or application of heat and pressure may cause at least a portion of fastener 220 to change color to substantially match the color of tread 108.

Figure 3:
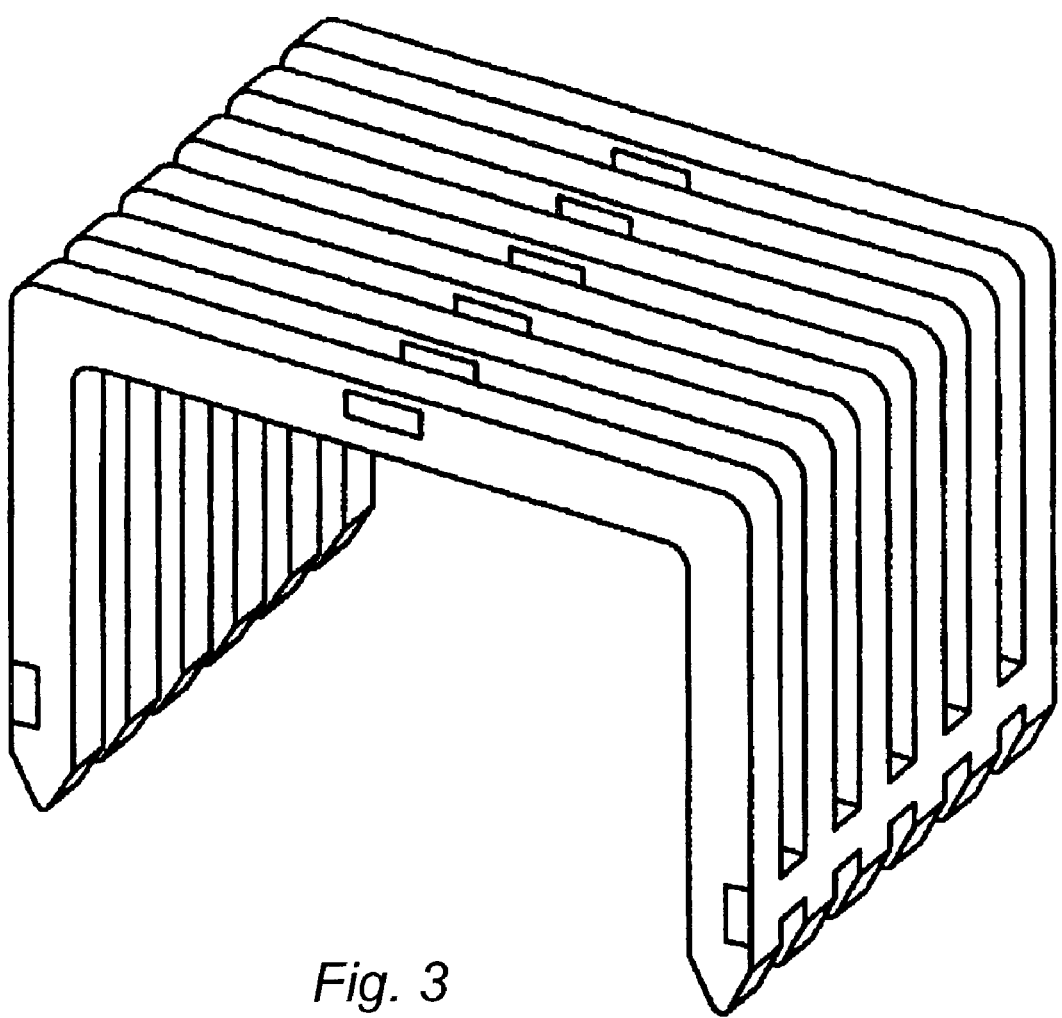
FIG. 3 depicts a side perspective view of an embodiment of a plastic impact driven fastener pack.

As previously mentioned, in various embodiments, a plastic impact driven fastener may be configured to operate with a standard impact driving device. Such fasteners may typically be formed or assembled in fastener packs. An example of a typical fastener pack is depicted in FIG. 3. Alternately, a plastic impact driven fastener or fastener pack may be configured to operate with a non-standard impact driving device. Geometric considerations for forming fasteners and fastener packs, are discussed in U.S. Pat. No. 6,168,362 to Tucker et al., U.S. Pat. No. 5,547,325 to Tucker et al. and U.S. Pat. No. 5,795,121 to Tucker et al.

In an embodiment, a plastic impact driven fastener may be formed using conventional methods of molding and/or shaping plastics. A composition used to form a plastic impact driven fastener may include one or more reinforcement materials. Examples of common reinforcement materials include, but are not limited to: glass fiber, beads, other silica based fillers, asbestos, polymeric fibers, metal fibers, mineral filters, boron fibers, carbon fibers and synthetic organic fibers. The composition may also include other additives to modify manufacturing characteristics and/or fastener characteristics.

Methods as described above and/or other methods may be selected depending upon materials used to form the fasteners. Suitable materials may be selected such that completed fasteners have relatively high flexural strength and relatively low heat deformation temperature. For example, for use in a tire retread process, a fastener should have sufficient flexural strength to at least partially penetrate tire tread. A typical automobile tire tread may have a durometer hardness (type A) of about 35 to about 80 standard units. In an embodiment, a fastener may have a flexural strength greater than about 9500 psi. In some embodiments, a fastener may have a flexural strength greater than about 10,000 psi, or even 12,000 psi. As used herein, "flexural strength" has its ordinary meaning in the art and may be measured by known methods, such as but not limited to ASTM test method D790-02 entitled "Standard Test Method for Flexural Strength Properties of Unreinforced and Reinforced Plastics and Electrical Insulating Materials," which is incorporated by reference as though fully set forth herein.

In addition to relatively high flexural strength, a plastic impact driven fastener as disclosed herein may have relative low heat deformation temperature. As used herein, "heat deformation temperature" has its ordinary meaning in the art and may be measured by known methods such as, ASTM test method D648-01 entitled "Standard Test Method for Deflection Temperature of Plastics Under Flexural Load in the Edgewise Position," which is incorporated by reference as though fully set forth herein. In particular, heat deformation temperatures discussed herein refer to deformation temperatures under approximately 264 psi load. A fastener may have a sufficiently low heat deformation temperature to allow a desired amount of deformation of the fastener during a heat application process or heat and pressure application process. As used herein, "deformation" refers to a change in the shape of an object.

Testing was conducted to determine materials suitable for use in forming fasteners as described above. In a particular series of tests, a number of polymers were used to form staples. The polymers included polymers having a crystalline component and polymers that had no crystalline component. Test samples included one or more polymers or copolymers of polyvinyl chloride, poly(acrylonitrile), poly(butadiene), poly(styrene), poly(ethylene), and/or poly(methyl acrylate). Although the tested polymers, copolymers and polymer blends were generally thermoplastics, it is recognized that certain thermoset polymers may also be suitable for use as fasteners having high flexural strength and relatively low heat deformation temperature. In the case of thermoset polymers, the heat deformation temperature may refer to the temperature at which thermal degradation of the polymer is sufficient to allow the polymer sample to be deformed by an applied pressure. Suitable thermoset polymer formulations may be determined through a testing regimen similar to the one described below regarding thermoplastic polymers.

The staples in the test samples were tested for rubber penetration and heat deformation properties as described below. Results of the tests are given in Table 1, which is shown in FIG. 4.

For each sample, the polymer pellets were dried in a forced-air convection oven at temperature A, as listed in column A of Table 1. The pellets were injection molded at a melting point of approximately temperature B and a mold temperature of temperature C, as listed in columns B and C of Table 1, respectively. The formed staples were then conditioned at room temperature and ambient humidity for at least 24 hours. After conditioning, the staples were subjected to two tests. Table 1 also reports the flexural strength and heat deformation temperature at 264 psi of each material as tested or reported by the material's manufacturer.

In Test 1, staples were loaded into a pneumatic stapler with compressed air supplied at about 90 psi. The staples were driven into a pre-cured rubber tread. The tread had a durometer hardness of about 63 standard units. The percentage of staples that successfully penetrated the tread is reported in Table 1, in the "TEST 1" column. For testing purposes, successful penetration was defined as penetration of the tread without breakage or folding of either leg of the staple.

In Test 2, individual staples were put into an oven set at 212° F. for 4 hours. It is believed that this temperature and time may be suitable to simulate a tire retread curing stage. Deformation of the staples was measured after heating. The deformation was measured by comparing the length of the crown of each staple after heating to the length of the crown before heating. Results of the second test are reported in Table 1 in the "TEST 2" column. The results are expressed as a percentage of the original length retained after heating. Therefore, a lower number indicates greater deformation.

Figure 5:
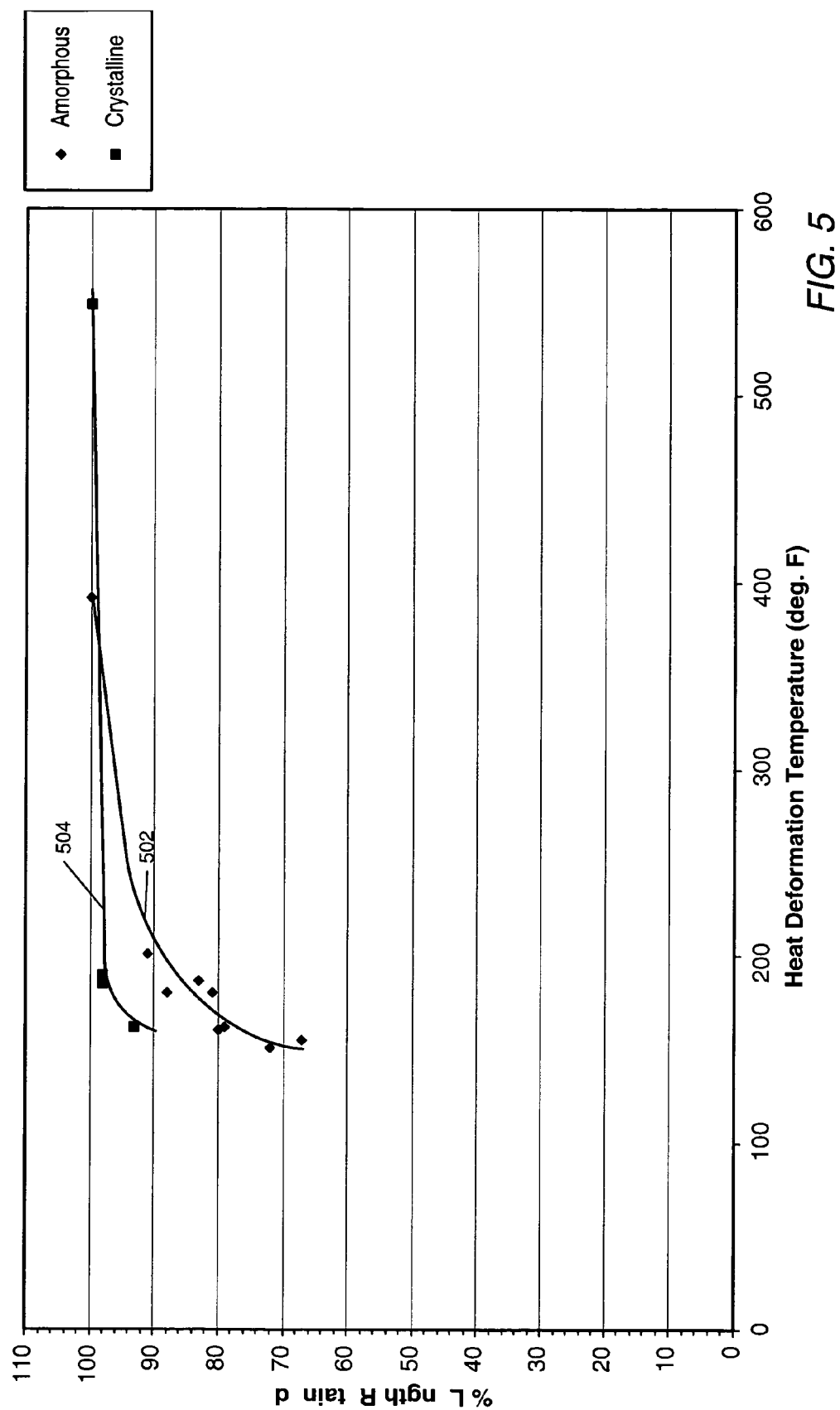
FIG. 5 depicts a graph of results of several experiments relating heat deformation temperature to percent length retained.

FIG. 5 depicts a graph correlating reported heat deformation temperature with percent length retained. Line 502 corresponds to a line fit estimated through data points for various amorphous polymers. Line 504 corresponds to a line fit estimated through data points for various crystalline polymers. As is seen with reference to line 502, a 93% length retained corresponds approximately to a crystalline polymer having a heat deformation temperature of about 150° F. Amorphous polymers do not exceed 93% length retained until approximately a heat deformation temperature of about 202° F. As used herein, an "amorphous" polymer refers to a polymer that does not have a substantially crystalline component. As used herein, a "crystalline" polymer refers to a polymer which has a substantial crystalline component.

Figure 6:
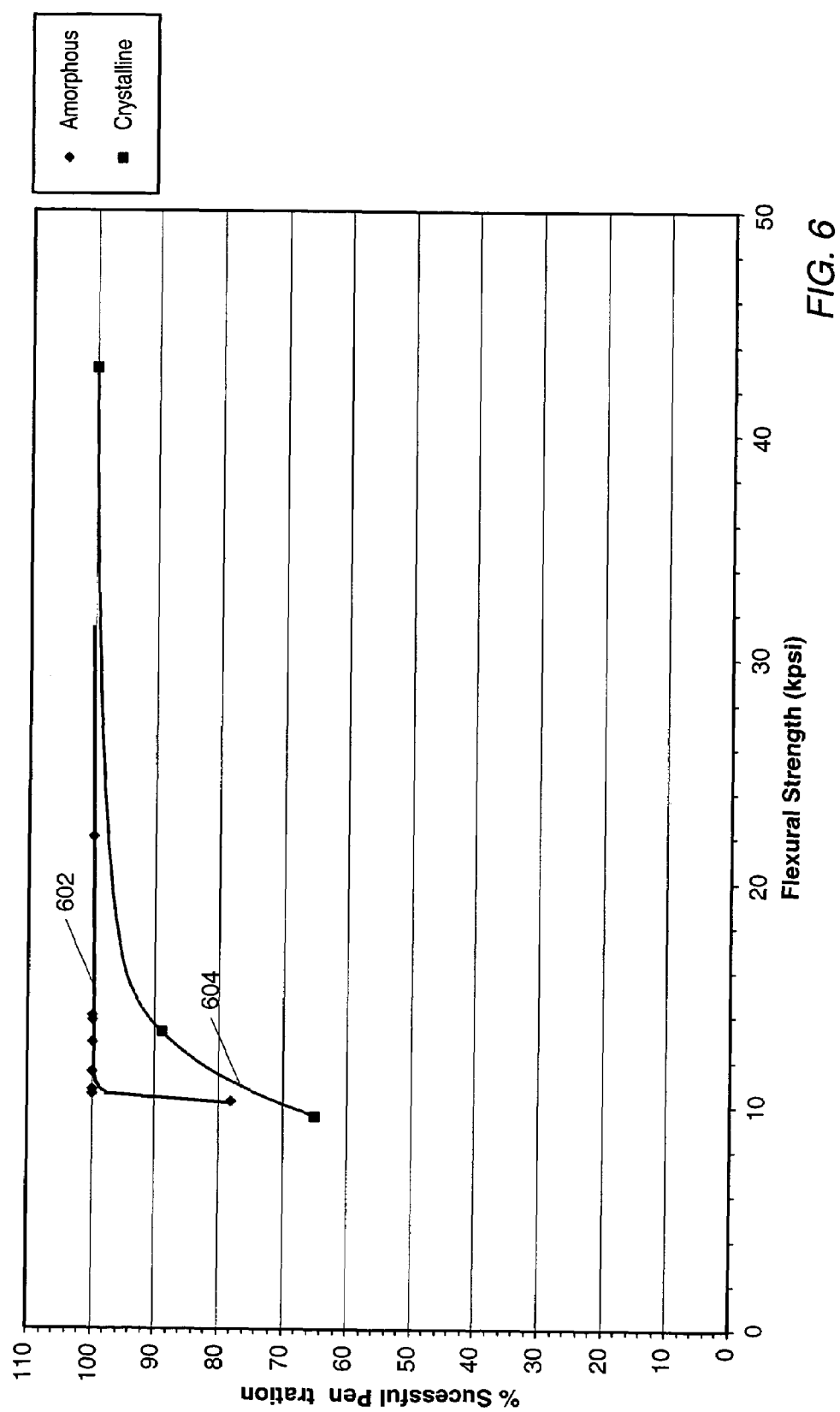
FIG. 6 depicts a graph of results of several experiments relating flexural strength to percent penetrations of a fastener.

FIG. 6 depicts a graph correlating reported flexural strength with successful penetration percentage. In FIG. 6, line 602 corresponds to results from various amorphous polymer compositions. Line 604 corresponds to results from various crystalline polymer compositions. As seen on line 604 a crystalline polymer with a flexural strength of about 10,000 psi may have a successful penetration rate of about 75%. It is further noted, based on line 604, that a crystalline polymer having a flexural strength as low as about 9500 psi may provide successful penetration at least some portion of the time. As can be seen with reference to line 602, an amorphous polymer may have a successful penetration rate of about 75% with a flexural strength of about 10,000 psi.

Based on the results shown in FIG. 4, FIG. 5 and FIG. 6, it is expected that fasteners formed from polymer samples 1, 6, 7, 8, 9, 10, 11 and 14 may perform suitably well. Additionally, other amorphous polymer compositions having a flexural strength greater than about 10,000 psi and a heat deformation temperature less than about 392° F. may perform suitably well. Crystalline polymer compositions having a flexural strength greater than about 9500 psi and a heat deformation temperature less than or equal to about 160° F. may also perform suitably well. For example suitable fasteners may be formed of polymers, copolymers and/or polymer blends including, but not limited to: poly(methyl methacrylate), polyvinyl chloride, poly(acrylonitrile), poly(butadiene), poly (styrene), poly(ethylene), and/or poly(methyl acrylate).

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

While the present invention has been described with reference to particular embodiments, it will be understood that the embodiments are illustrated and that the invention scope is not so limited. For example, fasteners disclosed herein may be used for other processes where a relatively high flexural strength and relatively low heat deformation temperature fastener is desired. Other variations, modifications, additions and improvements to the embodiments described are possible. These variations, modifications, additions and improvements may fall within the scope of the invention as detailed within the following claims.

What is claimed is:

1. An impact driven fastener for tire retreading, comprising:
    at least one penetrating portion formed of plastic, wherein plastic of the penetrating portion provides the penetrating portion with a flexural strength greater than about 9500 psi;
    at least one head portion having a heat deformation temperature less than about 250° F; and
    wherein the fastener is configured to, when heated to less than about 250° F. during a tire retreading process, at least partially soften.

2. The fastener of claim 1, wherein at least a portion of the fastener is black in color.

3. The fastener of claim 1, wherein the fastener comprises a staple.

4. The fastener of claim 1, wherein at least one penetrating portion has a flexural strength greater than about 10,000 psi.

5. The fastener of claim 1, wherein at least one penetrating portion has a flexural strength greater than about 12,000 psi.

6. The fastener of claim 1, wherein the plastic of at least one penetrating portion comprises a copolymer of acrylonitrile, butadiene and styrene.

7. The fastener of claim 1, wherein the plastic of at least one penetrating portion comprises a copolymer of acrylonitrile and styrene.

8. The fastener of claim 1, wherein the plastic of at least one penetrating portion comprises polystyrene.

9. The fastener of claim 1, wherein the plastic of at least one penetrating portion comprises poly(styrene acrylonitrile).

10. The fastener of claim 1, wherein the plastic of at least one penetrating portion comprises poly(methyl methacrylate).

11. The fastener of claim 1, wherein the plastic of at least one penetrating portion comprises polyvinyl chloride.

12. The fastener of claim 1, wherein the plastic of at least one penetrating portion comprises polyethylene.

13. The fastener of claim 1, wherein the plastic of at least one penetrating portion comprises poly(acrylonitrile).

14. The fastener of claim 1, wherein the plastic of at least one penetrating portion comprises poly (methyl acrylate).

15. The fastener of claim 1, wherein the plastic of at least one penetrating portion comprises a copolymer of acrylonitrile and methyl acrylate.

16. The fastener of claim 1, wherein the plastic of at least one penetrating portion comprises at least one reinforcing material.

17. The fastener of claim 1, wherein the fastener is configured to be loaded into an impact fastener driving device.

18. The fastener of claim 1, wherein the fastener comprises a thermoset polymer.

19. The fastener of claim 1, wherein a majority of at least one penetrating portion is plastic.

20. The fastener of claim 1, wherein at least one head portion comprises reinforcement material.

21. The fastener of claim 1, wherein at least a majority of the fastener is plastic.

22. The fastener of claim 1, wherein at least a portion of the fastener is configured to at least partially melt during heating of the retreading process.

23. The fastener of claim 1, wherein the fastener is configured such that heat and pressure of the tire retreading process soften and flatten one or more exposed portions of at least one head portion of the fastener.

24. The fastener of claim 1, wherein the fastener is configured such that heat and pressure of the tire retreading process allow at least one head portion to separate from at least one penetrating portion.

25. The fastener of claim 1, wherein at least one penetrating portion of the fastener is configured to soften when heated.

26. A fastener for a tire retread process, comprising:
    a least one penetrating portion, the penetrating portion consisting essentially of plastic, the plastic having a flexural strength greater than about 9500 psi;
    at least one head portion having a heat deformation temperature less than about 250° F.;
    wherein the penetrating portion extends from a tip to the head portion; and
    wherein the fastener is configured to at least partially soften during a tire retread process.

27. The fastener of claim 26, wherein at least one head portion consists essentially of plastic.

28. The fastener of claim 26, wherein at least one penetrating portion comprises reinforcement material.

29. The fastener of claim 26, wherein at least a majority of the fastener is plastic.

30. The fastener of claim 26, wherein at least a portion of the fastener is configured to at least partially melt during heating of the retreading process.

31. The fastener of claim 26, wherein the fastener is configured such that heat and pressure of the tire retreading process soften and flatten one or more exposed portions of at least one head portion of the fastener.

32. The fastener of claim 26, wherein the fastener is configured such that heat and pressure of the tire retreading process allow at least one head portion to separate from at least one penetrating portion.

33. The fastener of claim 26, wherein at least one penetrating portion of the fastener is configured to soften when heated.

34. A fastener for a tire retread process, comprising:
   at least one penetrating portion, wherein at least one penetrating portion has a flexural strength greater than about 9500 psi;
   a head portion coupled to at least one penetrating portion, the head portion having a heat deformation temperature less than about 250° F., and the head portion consisting essentially of plastic; and
   wherein the fastener is configured to at least partially soften during a tire retread process.

35. The fastener of claim 34, wherein at least one penetrating portion consists essentially of plastic.

36. The fastener of claim 34, wherein the head portion comprises reinforcement material.

37. The fastener of claim 34, wherein at least a majority of the fastener is plastic.

38. The fastener of claim 34, wherein at least a portion of the fastener is configured to at least partially melt during heating of the retreading process.

39. The fastener of claim 34, wherein the fastener is configured such that heat and pressure of the tire retreading process soften and flatten one or more exposed portions of at least one head portion of the fastener.

40. The fastener of claim 34, wherein the fastener is configured such that heat and pressure of the tire retreading process allow at least one head portion to separate from at least one penetrating portion.

41. The fastener of claim 34, wherein at least one penetrating portion of the fastener is configured to soften when heated.

42. A staple for a tire retread process, comprising:
   a first penetrating portion formed of plastic, wherein plastic of the first penetrating portion provides the first penetrating portion with a flexural strength greater than about 9500 psi;
   a second penetrating portion;
   a plastic head coupled to the first penetrating portion and the second penetrating portion, the plastic head having a heat deformation temperature less than about 250° F.;
   wherein the first plastic penetrating portion extends from a tip to the plastic head, and wherein the second plastic penetrating portion extends from a tip to the plastic head; and
   wherein the fastener is configured to at least partially soften during a tire retread process.

43. The staple of claim 42, wherein the first penetrating portion comprises reinforcement material.

44. The fastener of claim 42, wherein at least a majority of the fastener is plastic.

45. The fastener of claim 42, wherein at least a portion of the fastener is configured to at least partially melt during heating of the retreading process.

46. The fastener of claim 42, wherein the fastener is configured such that heat and pressure of the tire retreading process soften and flatten one or more exposed portions of at least one head portion of the fastener.

47. The fastener of claim 42, wherein the fastener is configured such that heat and pressure of the tire retreading process allow at least one head portion to separate from at least one penetrating portion.

48. The fastener of claim 42, wherein at least one penetrating portion of the fastener is configured to soften when heated.

* * * * *

UNITED STATES PATENT AND TRADEMARK OFFICE
CERTIFICATE OF CORRECTION

PATENT NO. : 7,581,911 B2  Page 1 of 1
APPLICATION NO. : 10/246791
DATED : September 1, 2009
INVENTOR(S) : Tucker et al.

It is certified that error appears in the above-identified patent and that said Letters Patent is hereby corrected as shown below:

Claim 26, col. 8, line 52, please delete "a least" and substitute therefor -- at least --.

Signed and Sealed this

Third Day of November, 2009

David J. Kappos
*Director of the United States Patent and Trademark Office*